United States Patent
Hashimoto et al.

(10) Patent No.: US 7,610,419 B2
(45) Date of Patent: Oct. 27, 2009

(54) DATA TRANSMISSION APPARATUS, DATA RECEPTION APPARATUS, DATA TRANSMISSION AND RECEPTION APPARATUS AND DATA TRANSMISSION AND RECEPTION METHOD

(75) Inventors: Takumi Hashimoto, Sakural (JP); Kunihiro Katayama, Kyoto (JP); Yoshiaki Nakade, Tenri (JP); Yasuki Kawasaka, Kyoto (JP); Masayuki Shinagawa, Yamatokouriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 994 days.

(21) Appl. No.: 11/172,850

(22) Filed: Jul. 5, 2005

(65) Prior Publication Data
US 2006/0013291 A1 Jan. 19, 2006

(30) Foreign Application Priority Data
Jul. 5, 2004 (JP) .............................. 2004-198694

(51) Int. Cl.
*G06F 3/00* (2006.01)
*G06F 3/36* (2006.01)
*G06F 13/00* (2006.01)

(52) U.S. Cl. ................. 710/71; 710/1; 710/65; 710/69; 345/87; 345/88; 345/89; 345/90; 345/91; 345/92; 345/204; 345/205; 345/206

(58) Field of Classification Search ............ 710/1, 710/69, 71, 65; 345/87–92, 204–206
See application file for complete search history.

(56) References Cited

U.S. PATENT DOCUMENTS

| 6,448,962 B1 * | 9/2002 | McKnight et al. ............ 345/205 |
| 6,628,253 B1 * | 9/2003 | Hiroki .......................... 345/87 |
| 2003/0156086 A1 | 8/2003 | Maeda et al. |

FOREIGN PATENT DOCUMENTS

| EP | 1 215 894 | 6/2002 |
| GB | 2 395 876 | 6/2004 |
| JP | 2002-218455 | 8/2002 |

OTHER PUBLICATIONS

European Search Report issued in corresponding application.

* cited by examiner

*Primary Examiner*—Tammara Peyton
(74) *Attorney, Agent, or Firm*—Harness, Dickey & Pierce, P.L.C.

(57) ABSTRACT

An image data serial signal output from the parallel-serial converting circuit 21 is converted into a differential amplitude signal by the LVDS transmitter 22 in such a manner that the amplitude of the differential voltage of the image data parallel signal varies depending on the value of the synchronization code serial signal. Accordingly, the signal values of the synchronization code serial signal and the image data serial signal are simultaneously transmitted. On the reception side, the differential amplitude signal in which the amplitude of the differential voltage of the image data serial signal varies depending on the value of the synchronization code serial signal is received by the LVDS receiver 31. The signal values of the synchronization code serial signal and the image data serial signal are separated and output based on a predetermined comparison processing.

11 Claims, 8 Drawing Sheets

FIG.4

| Synchronization code | Image data serial signal (transmission side and reception side : Y) | Synchronization code serial signal (transmission side and reception side : S) |
|---|---|---|
| FS | Arbitrary image data | 11110000 |
| LS | Arbitrary image data | 11100000 |
| LE | Arbitrary image data | 11000000 |
| FE | Arbitrary image data | 10000000 |
| Line data | Arbitrary image data | 00000000 |

FIG.5

| Synchronization code | Image data serial signal (transmission side and reception side : Y) | Synchronization code serial signal (transmission side : S) |
|---|---|---|
| Synchronization code | Arbitrary image data | 10000000 |
| Line data | Arbitrary image data | 00000000 |

DATA TRANSMISSION APPARATUS, DATA RECEPTION APPARATUS, DATA TRANSMISSION AND RECEPTION APPARATUS AND DATA TRANSMISSION AND RECEPTION METHOD

This Nonprovisional application claims priority under 35 U.S.C. §119(a) on patent application No. 2004-198694 filed in Japan on Jul. 5, 2005, the entire contents of which are hereby incorporated by reference.

BACKGROUND OF THE INVENTION

1. Field of the Invention

The present invention relates to a data transmission apparatus for transmitting data between a camera module and an electronic information apparatus connected to the camera module and particularly for transmitting data between an image display device (i.e. a display device) of a mobile communication terminal apparatus and a camera module, as well as a data reception apparatuses for receiving data transmitted by the data transmission apparatus, a data transmission and reception apparatus including the data transmission apparatus and the data reception apparatus, and a data transmission and reception method.

2. Description of the Related Art

Generally speaking, in digital cameras and digital video cameras, for example, conversion from optical images to electric signals is realized with the use of image sensors (e.g. Charge Couple Devices (CCD) or Complementary Metal Oxide Semiconductors (CMOS)). Each of the elements that constitute such an image sensor is a plate including small and regularly-arranged picture elements (pixel units which are also referred to as a detector matrix) that are sensitive to light and colors. The resolution level of such a detector matrix varies depending on its physical size and its degree of integration. Generally speaking, an image sensor includes hundreds of thousands or more pixels that are two-dimensionally arranged in a matrix.

With regard to the manufacturing process of such image sensors, it is possible to integrate a digital electronic apparatus and an image sensor that is an analog electronic apparatus on one semiconductor device with the use of CMOS techniques which are highly developed. Further, due to reduction in the size and weight of camera modules, it is possible to mount a camera module in a smaller electronic information apparatus, such as a portable computer or a portable mobile communication terminal apparatus in each of which a camera module is integrated.

For example, when a camera module is mounted on a portable computer or a portable mobile communication terminal apparatus, a large number of output lines are required for image signals output from the camera module. This situation where a large number of output lines are required poses a big problem in dealing with wiring problems of digital image signals, data transmission problems, unnecessary radiant noise problems, and in the endeavor of reducing the costs and electric power consumption of the terminal apparatuses and the systems as well as of making the apparatuses and the system compact.

As an example of a digital data transmission and reception method to solve these problems, Japanese Laid-open Publication No. 2002-218455 discloses an LVDS (Low Voltage Differential Signal) serial transmission and reception method for accurately transferring digital image signals, which is shown in FIG. 6.

FIG. 6 is a block diagram that shows an example of a configuration of the main part of a conventional digital data transmission and reception circuit.

As shown in FIG. 6, the digital data transmission and reception circuit 100 includes a data transmission apparatus 101 for transmitting data and a data reception apparatus 111 for receiving the transmitted data. Because data is transmitted and received this way, it is not necessary to have a large number of output lines for the image signals output from the data transmission apparatus 101, unlike the example mentioned above.

The data transmission apparatus 101 includes a supply voltage Vin input unit 103 for controlling the circuit 102, an input unit 104 for receiving transferred bit elements, output units 105 and 106 for transferring non-inverted current signals and inverted current signals, and a resistor 107 for setting an external current.

The data reception apparatus 111 includes a supply voltage Vin input unit 113 for controlling the circuit 112, input units 114 and 115 for receiving non-inverted current signals and inverted current signals, an output unit 116 for outputting bit elements from received current signals, and a resistor 117 for setting an external gain.

In such a case, data transfer is performed by the data transmission apparatus 101 and the data reception apparatus 111 which operate with a supply voltage of a mobile communication terminal apparatus (the supply voltage being, for example, 1.5V to 1.8V as compared to a typical LVDS supply voltage being approximately 3.0V) and use current signals of sub-LVDS type; however, the arrangement may not be limited to this example.

Signals are transferred from the data transmission apparatus 101 to the data reception apparatus 111 via the transfer lines 118 and 119, with the use of a self-biased signal transfer method in accordance with FIG. 6. According to this self-biased signal transfer method, a resistor 120 (for example, with a resistance value of 100 ohm) is provided between the transfer lines 118 and 119.

FIG. 7 shows the waveform pattern of the transfer lines 118 and 119 from the data transmission apparatus 101 to the data reception apparatus 111. It should be noted that the operational principle here is not different from that of a normal LVDS circuit.

As shown in FIG. 7, an electric signal in the transfer lines 118 and 119 is interpreted as one bit in the case where the voltage waveform of the transfer line 118, which is a non-inversion line, is positive. In such a case, the voltage waveform of the transfer line 119, which is an inversion line, is negative. Likewise, an electric signal is interpreted as 0 (zero) bit in the opposite situation. Using a pair made up of a current signal transmitter and a current signal receiver that are of sub-LVDS type makes it possible to achieve a high data-transfer rate, while electromagnetic noises are kept at a minimum level.

The following describes an example of image data output by the data transmission apparatus 101 from a camera module to an image display device, using image data for a VGA size as an example.

In image data for a VGA size, data for 640 pixels are included per line, and data for 480 lines are included per frame. In many cases, the data size for one pixel is 8 bits to 14 bits, depending on the bit number that is obtained when a signal from an image pickup element is quantified as a digital value. According to a conventional technique, image data output from a camera module to an image display device requires that one frame is dealt with in units of a number of lines. FIG. 8 shows an example of a data sequence in serial transmission and reception, which is used as a method of identifying in which frame, image data belongs to one of such lines.

In FIG. 8, the starting end of a frame is indicated by a synchronization code FS (Frame Starting end) 201, and the ending end of the frame is indicated by a synchronization code FE (Frame Ending end) 202. Thus, the frame is fixed using the special synchronization codes. Within such a frame, image data and statistical data for each line also has a synchronization code LS (Line Starting end) 203 indicating the starting end of the record and a synchronization code LE (Line Ending end) 204 indicating the ending end of the record. Here, the statistical data is, for example, accumulated luminosity values and is used for controlling the exposure so that the display screen gets darker when it is too bright or the display screen gets brighter when it is too dark.

In the present situation, the frame starting end synchronization code 201 is transferred and followed by image data for the first line 205 and the line ending end synchronization code LE 204. Further, the line starting end synchronization code LS 203 is followed by image data for the second line 205 and the line ending end synchronization code LE 204. In this manner, image data 205 for one of lines 1 through 480 is transferred between a line starting end synchronization code LS 203 indicating the starting end of the line and a line ending end synchronization code LE 204 indicating the ending end of the line. Further, after the image data 205 for the final line, which is the line 480, and the line ending end synchronization code LE 204 are transferred, the line starting end synchronization code LS 203 is transferred, and then statistical data SD 206 is transferred. Subsequently, after the statistical data SD 206 is transferred, a frame ending end synchronization code FE 202 which indicates the ending end of the transferred frame is transferred.

The statistical data amount of statistical data SD 206 may be smaller or larger than the data amount in one image data line. Thus, in correspondence with this, there is a possibility that the final line may be shorter or longer. It is, however, very unlikely that a problem arises because of this situation. The reason is because as the starting end of a frame is indicated by a synchronization code FS 201, and the ending end of a frame is indicated by a synchronization code FE 202, the frame is fixed with the use of special synchronization codes that do not appear in image data. With this arrangement, it is possible to easily separate, on the reception side, the image data 205 for the lines 1 through 480 and the statistical data SD 206 from a data sequence, on an assumption that within one frame, 480 data units of image data that are separated from one another by synchronization codes are included, and also the 481$^{st}$ data unit includes the statistical data SD 206. Furthermore, in the case where it is understood in advance that no statistical data SD 206 exists, it is possible to separate, on the reception side, the 480 data units of image data 205.

According to the conventional LVDS (Low Voltage Differential Signal) serial transmission and reception method disclosed in Patent Document 1 mentioned above, it is possible to have effects of realizing image signals output by a camera module with a smaller number of wirings and of solving the problems by reducing unnecessary radiant noises, reducing the costs and electric power consumption of the system, and making the system compact; however, in order to easily separate image data 205 for each frame and each line without failure, and to easily separate the image data 205 from the statistical data SD 206 following the image data 205 without failure, it is necessary to use the frame starting end synchronization code FS 201 and the frame ending end synchronization code FE 202, as well as the line starting end synchronization code LS 203 that indicates a starting end of each line within the frame, and the line ending end synchronization code LE 204 that indicates the ending end of each line, which are special synchronization codes that do not appear in the image data 205. Thus, it is necessary to insert synchronization codes before and after the image data 205 for each line and the statistical data SD 206 to be inputted to the input unit 104 of the data transmission apparatus 101, and it is also necessary to detect the synchronization codes that are present before and after the image data 205 for each line and the statistical data SD 206 to be output from the output unit 116 of the data reception apparatus 111, and to separate the synchronization codes from other data such as the image data 205 and the statistical data SD 206; therefore, it is necessary to provide a synchronization code inserting circuit at a stage prior to the data transmission apparatus 101 and to provide a synchronization code separating circuit at a stage after the data reception apparatus 111. Consequently, this arrangement is not appropriate because it requires further improvement in order to make transmission and reception faster and to make the transmission and reception timing control circuit smaller in size.

The present invention aims to solve the problems of the conventional technique that are mentioned above, and particularly with regard to LVDS data transmission and reception between a camera module and an electronic information apparatus, aims to provide a data transmission apparatus, a data reception apparatus that receives data from the data transmission apparatus, a data transmission and reception apparatus and a data transmission and reception method in which these apparatuses are used, with which it is possible to easily and accurately recognize the positions of image data, such as the starting end and the ending end of one frame and the starting end and the ending end of image data for one line, as well as the starting end and the ending end of data for one pixel without increasing the data amount in serial transmission, with the use of multiplexing processing and separation processing of image data and synchronization codes, and also to make such data transmission and reception faster and to make a transmission and reception timing control circuit smaller in size.

SUMMARY OF THE INVENTION

A data transmission apparatus according the present invention includes: a parallel-serial converting section for converting an image data parallel signal having N bits per pixel where N is a natural number into an image data serial signal; and a differential amplitude signal transmitting section for converting the image data serial signal output from the parallel-serial converting section into a differential amplitude signal by varying an amplitude of a differential voltage of the image data serial signal depending on a value of a synchronization code serial signal indicating a position of image data, so that the respective signal values of the synchronization code serial signal and the image data serial signal can be transmitted simultaneously.

In one embodiment of the present invention, the differential amplitude signal transmitting section includes: an LVDS (Low Voltage Differential Signal) transmitting section for converting the image data serial signal output from the parallel-serial converting section into the differential amplitude signal; and a constant current control section for controlling a constant current supplied to the LVDS transmitting section depending on the value of the synchronization code serial signal.

In one embodiment of the present invention, the constant current control section includes: a transistor section that takes the synchronization code serial signal as a gate input; a first constant current power source connected to a source side of the transistor section; and a second constant current power source connected in parallel to a series circuit that includes the transistor section and the first constant current power source, and wherein the constant current control section supplies a constant current to the LVDS transmitting section, the constant current corresponding to either the first and second current power sources or the second constant current power source, depending on the value of the synchronization code serial signal.

In one embodiment of the present invention, the constant current control section includes: a transistor section for receiving the synchronization code serial signal as a gate input; and a constant current power source connected to a source side of the transistor section, and wherein the constant current control section supplies one of two types of constant currents corresponding to the gate input to the LVDS transmitting section, depending on the value of the synchronization code serial signal.

In one embodiment of the present invention, the data transmission apparatus further includes: a resistance section provided between two output transfer lines of the LVDS transmitting section for converting a signal current output from the LVDS transmitting section into a signal voltage.

In one embodiment of the present invention, a data sequence of the synchronization code serial signal includes a unique data sequence In which four types of synchronization codes are identifiable as positional information of the image data, the four types of synchronization codes being a synchronization code FS indicating a starting end of one frame of the image data, a synchronization code FE Indicating an ending end of the one frame, a synchronization code LS indicating a starting end of one line which constitutes a part of the one frame, and a synchronization code LE indicating an ending end of the one line.

In one embodiment of the present invention, a data sequence of the synchronization code serial signal includes one type of synchronization code having N bits where N is a natural number, the one type of synchronization code indicating a starting end and an ending end of one frame of the image data and a starting end and an ending end of one line which constitutes a part of the one frame.

In one embodiment of the present invention, a data sequence of the synchronization code serial signal includes one type of synchronization code having N bits where N is a natural number, the one type of synchronization code indicating a starting end and an ending end of one frame of the image data.

In one embodiment of the present invention, a data sequence of the synchronization code serial signal includes one type of synchronization code having N bits where N is a natural number, the one type of synchronization code indicating a starting end of one frame of the image data.

In one embodiment of the present invention, a data sequence of the synchronization code serial signal includes one type of synchronization code having N bits where N is a natural number, the one type of synchronization code indicating a starting end and an ending end of one pixel data of the image data.

In one embodiment of the present invention, a data sequence of the synchronization code serial signal includes one type of synchronization code having N bits where N is a natural number, the one type of synchronization code indicating a starting end of one pixel data of the image data.

According to another aspect of the present invention a data reception apparatus includes: a differential amplitude signal receiving section for receiving a differential amplitude signal obtained by varying an amplitude of a differential voltage of an image data serial signal depending on a value of a synchronization code serial signal and for separating and outputting the respective signal values of the synchronization code serial signal and the image data serial signal based on a predetermined comparison processing.

In one embodiment of the present invention, the data reception apparatus further includes: a synchronization signal converting section for converting the synchronization code serial signal output from the differential amplitude signal receiving section into a synchronization signal indicating a position of image data; and a serial-parallel converting section for converting the image data serial signal output from the differential amplitude signal receiving section into an image data parallel signal having N bits per pixel where N is a natural number.

In one embodiment of the present invention, the differential amplitude signal receiving section is an LVDS (Low Voltage Differential Signal) receiving section that receives the respective signal values of the synchronization code serial signal and the image data serial signal via a resistance section which converts a signal current of the differential amplitude signal into a signal voltage, wherein the respective signal values are transmitted simultaneously by varying the amplitude of the differential voltage of the differential amplitude signal.

In one embodiment of the present invention, in the predetermined comparison processing, each of the signal values of the synchronization code serial signal and the image data serial signal is detected to be either "0" or "1".

In one embodiment of the present invention, a data sequence of the synchronization code serial signal includes a unique data sequence in which four types of synchronization codes are identifiable as positional information of the image data, the four types of synchronization codes being a synchronization code FS indicating a starting end of one frame of the image data, a synchronization code FE indicating an ending end of the one frame, a synchronization code LS indicating a starting end of one line which constitutes a part of the one frame, and a synchronization code LE indicating an ending end of the one line.

In one embodiment of the present invention, a data sequence of the synchronization code serial signal includes one type of synchronization code having N bits where N is a natural number, the one type of synchronization code indicating a starting end and an ending end of one frame of the image data and a starting end and an ending end of one line which constitutes a part of the one frame.

In one embodiment of the present invention, a data sequence of the synchronization code serial signal includes one type of synchronization code having N bits where N is a natural number, the one type of synchronization code indicating a starting end and an ending end of one frame of the image data.

In one embodiment of the present invention, a data sequence of the synchronization code serial signal includes one type of synchronization code having N bits where N is a natural number, the one type of synchronization code indicating a starting end of one frame of the image data.

In one embodiment of the present invention, a data sequence of the synchronization code serial signal includes one type of synchronization code having N bits where N is a natural number, the one type of synchronization code indicating a starting end and an ending end of one pixel data of the image data.

In one embodiment of the present invention, a data sequence of the synchronization code serial signal includes one type of synchronization code having N bits where N is a natural number, the one type of synchronization code indicating a starting end of one pixel data of the image data.

According to another aspect of the present invention a data transmission and reception apparatus includes: a data transmission apparatus; and a data reception apparatus, wherein data transmitted from the data transmission apparatus is received by the data reception apparatus, the data transmission apparatus includes: a parallel-serial converting section for converting an image data parallel signal having N bits per pixel where N is a natural number into an image data serial signal; and a differential amplitude signal transmitting section for converting the image data serial signal output from the parallel-serial converting section into a differential amplitude signal by varying an amplitude of a differential voltage of the image data serial signal depending on a value of a synchronization code serial signal indicating a position of image data, so that the respective signal values of the synchronization code serial signal and the image data serial signal can be transmitted simultaneously, the data reception apparatus includes: a differential amplitude signal receiving section for receiving the differential amplitude signal and for separating and outputting the respective signal values of the synchronization code serial signal and the image data serial signal based on a predetermined comparison processing.

In one embodiment of the present invention, the image data and the synchronization codes can be transmitted and received in a multiplexed manner between a camera module and an image display device of an electronic information apparatus.

According to another aspect of the present invention a data transmission and reception method includes: a parallel-serial converting step of converting an image data parallel signal having N bits per pixel where N is a natural number into an image data serial signal; a differential amplitude signal transmitting step of converting the image data serial signal into a differential amplitude signal by varying an amplitude of a differential voltage of the image data serial signal depending on a value of a synchronization code serial signal, so that the respective signal values of the synchronization code serial signal and the image data serial signal can be transmitted simultaneously; and a differential amplitude signal receiving step of receiving the differential amplitude signal and separating and outputting the respective signal values of the synchronization code serial signal and the image data serial signal.

In one embodiment of the present invention, the differential amplitude signal receiving step includes a separation step of separating the synchronization code serial signal and the image data serial signal, and the data transmission and reception method further includes: a synchronization signal detecting step of detecting a synchronization signal from the synchronization code serial signal obtained in the separation step; and an image data parallel signal converting step of converting the image data serial signal obtained in the separation step into a parallel signal having N bits per pixel where N is a natural number.

The following describes how the present invention works with the configurations described above.

According to the present invention, a data transmission and reception apparatus that transmits and receives data between a camera module and an electronic information apparatus that are connected to each other includes: a data transmission apparatus including a parallel-serial converting section for converting an image data parallel signal having N bits per pixel (where N is a natural number) into an image data serial signal, and a differential amplitude signal transmitting section for converting the image data serial signal output from the parallel-serial converting section into a differential amplitude signal in such a manner that an amplitude of a differential voltage of the image data parallel signal varies depending on a value of a synchronization code serial signal that indicates a position of image data, so that signal values of the synchronization code serial signal and the image data serial signal are simultaneously transmitted; and a data reception apparatus including a differential amplitude signal receiving section for receiving the differential amplitude signal in which the amplitude of the differential voltage of the image data serial signal varies depending on the value of the synchronization code serial signal and for separating and outputting the signal values of the synchronization code serial signal and the image data serial signal, based on a predetermined comparison processing.

With this arrangement described above, since a serial transmission and reception method is used in which data is transmitted and received through conversion of the image data parallel signal into the image data serial signal, it is possible to realize image data output from a camera module with a smaller number of wirings and to reduce unnecessary radiant noises, to reduce costs and electric power consumption of the system, and to make the system smaller in size.

Further, with this arrangement, it is possible to convert the image data serial signal output from the parallel-serial converting section into the differential amplitude signal in such a manner that the amplitude of the differential voltage of the image data parallel signal varies depending on the value of the synchronization code serial signal so that the signal values of the sychronization code serial signal and the image data serial signal are simultaneously transmitted, and also, on the reception side, it is possible to receive the differential amplitude signal in which the amplitude of the differential voltage of the image data serial signal varies depending on the value of the synchronization code serial signal and to separate and output the signal values of the synchronization code serial signal and the image data serial signal based on the predetermined comparison processing. Consequently, it is possible to easily and accurately recognize the positions of image data without increasing the data amount in serial transmission. Furthermore, since it is possible to realize the multiplexing processing and the separation processing of the image data and the synchronization codes with a circuit having a smaller size, the transmission and reception timing control circuit also has a smaller size, and it is possible to make data transmission and reception processing faster.

As explained so far, according to the present invention, particularly in a data transmission and reception apparatus that transmits and receives data between a camera module and an electronic information apparatus, an image data serial signal to be transmitted and received is transmitted in such a manner that the amplitude of the LVDS transmission and reception differential voltage varies depending on the synchronization code; therefore, it is possible to easily and accurately recognize the positions of the image data without increasing the data amount in serial transmission. In such a situation, since it is possible to realize the multiplexing processing and the separation processing of the image data and the synchronization codes with a circuit having a smaller size, it is also possible to make the transmission and reception timing control circuit smaller in size and to make the transmission and reception faster. Further, it is possible to improve the level of resistance against communication errors that may occur on the reception apparatus side because the amplitude width of the synchronization codes is made to be larger.

These and other advantages of the present invention will become apparent to those skilled in the art upon reading and understanding the following detailed description with reference to the accompanying figures.

BRIEF DESCRIPTION OF THE DRAWINGS

FIG. 4 is a table that shows an example of a data sequence of synchronization signals with the waveform pattern of the transmission and reception data differential amplitude signal shown in FIG. 2.

FIG. 5 is a table that shows another example of a data sequence of synchronization signals with the waveform pattern of the transmission and reception data differential amplitude signal shown in FIG. 2.

DESCRIPTION OF THE PREFERRED EMBODIMENTS

The following describes in detail the data transmission and reception apparatus and the data transmission and reception method according to the present invention, with reference to the drawings.

Figure 1:
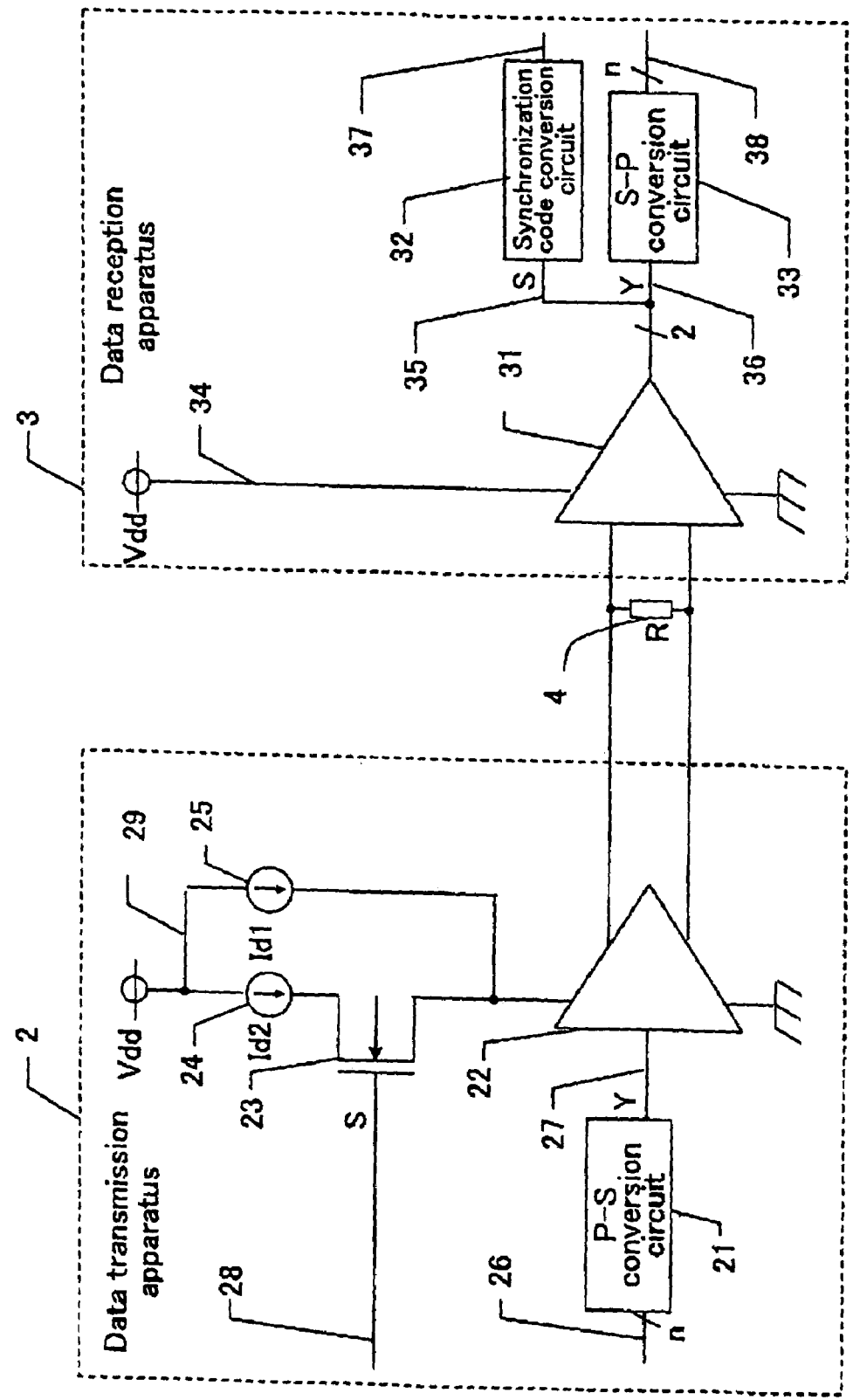
FIG. 1 is a block diagram that shows an example of the configuration of the main part of a digital data transmission and reception apparatus according to the present invention.

FIG. 1 is a block diagram that shows a configuration example of the main part of a data transmission and reception apparatus according to the present invention.

As shown in FIG. 1, the data transmission and reception apparatus 1 includes a data transmission apparatus 2 that transmits digital data and a data reception apparatus 3 that receives the transmitted digital data. For example, the data transmission and reception apparatus 1 transmits and receives digital data between a camera module and an image display device of an electronic information apparatus. It should be noted that the data transmission and reception apparatus 1 further includes a resistor 4 for converting electric current/voltage, which serves as a resistance section that converts a signal current output from the data transmission apparatus 2 to the data reception apparatus 3 side into a signal voltage. The resistor 4 for converting electric current/voltage is provided on the outside of the data transmission apparatus 2. Although It is acceptable to provide the resistor 4 on the data reception apparatus 3 side, the resistor 4 is provided on the data transmission apparatus 2 side in the present example.

The data transmission apparatus 2 includes: a parallel-serial converting circuit 21 that serves as a parallel-serial converting section; an LVDS transmitter 22 that serves as an LVDS (Low voltage Differential Signal) transmitting section; an Nch transistor 23 that serves as an amplitude switching section (a transistor section); a constant current power source 24 that serves as a first constant current power source; and a constant current power source 25 that serves as a second constant current power source. A differential amplitude signal transmitting section is constituted with the LVDS transmitter 22, the Nch transistor 23, and the constant current power sources 24 and 25. The differential amplitude signal transmitting section converts the image data serial signal 27 output from the parallel-serial converting circuit 21 into a differential amplitude signal (an output signal to both of the transfer lines) in such a manner that the amplitude of the differential voltage (the voltage between the transfer lines) in the differential amplitude signal varies depending on the value of the synchronization code serial signal 28 that indicates the position of the image data, so that the signal value S of the synchronization code serial signal 28 and the signal value Y of the image data serial signal 27 are simultaneously transmitted via both of the transfer lines. Further, a constant current control section is constituted with the Nch transistor 23 and the constant current power sources 24 and 25. The constant current control section controls the constant current supplied to the LVDS transmitter 22, depending on the value S of the synchronization code serial signal 28.

The parallel-serial converting circuit 21 takes parallel image data (an image data parallel signal) having N bits per pixel (where N is a natural number) as image input data and converts the image data parallel signal 26 having N bits per pixel (where N is a natural number) into serial image data (an image data serial signal).

The LVDS transmitter 22 converts the transmission-side image data serial signal 27 output from the parallel-serial converting circuit 21 into a differential amplitude signal.

In the Nch transistor 23, a transmission-side synchronization code serial signal 28, which is a serial synchronization signal, is inputted to the gate, and the output terminal of the constant current power source 24 is connected to the source line so that a constant current is supplied, whereas the power source voltage input terminal of the LVDS transmitter 22 and the output terminal of the constant current power source 25 are connected to the drain line. With this arrangement, the Nch transistor 23 is able to control the output of the constant current power source 24 to the LVDS transmitter 22 by turning the output on and off, depending on the transmission-side synchronization code serial signal 28, so that the constant current is switched between a constant current from the constant current power sources 24 and 25 and a constant current from only the constant current power source 25.

The constant current power source 24 is connected to a point between the output terminal 29 of the power source voltage Vdd and the source line of the Nch transistor 23 so that a predetermined constant current is supplied to the LVDS transmitter 22 via the Nch transistor 23.

The constant current power source 25 is connected in parallel to the series circuit which is made up of the constant current power source 24 and the Nch transistor 23 and supplies either the constant current from the constant current power source 25 or the constant current from the constant current power sources 24 and 25 to the LVDS transmitter 22.

On the other hand, the data reception apparatus 3 includes: an LVDS (Low Voltage Differential Signal) receiver 31 that serves as an LVDS receiving section; a synchronization code converting circuit 32 that serves as a synchronization signal converting section; and a serial-parallel converting circuit 33 that serves as a serial-parallel converting section.

The LVDS receiver 31 is provided between the output terminal 34 of the power source voltage Vdd and a ground voltage connection terminal and receives the current output from the LVDS transmitter 22 as a voltage, as well as separates and outputs the reception-side synchronization serial signal 35 and the image data serial signal 36. Via the resistor 4 that converts, into a signal voltage, a signal current which is output from the LVDS transmitter 22 and in which the signal values of the synchronization code serial signal 28 and the image data serial signal 27 are multiplexed and simultaneously transmitted, by way of varying the amplitude width of the differential voltage from the LVDS transmitter 22, the LVDS receiver 31 receives the signal current as the signal voltage. In other words, a differential amplitude signal receiving section is constituted with the LVDS receiver 31. The differential amplitude signal receiving section receives a differential amplitude signal in which the amplitude of the output differential voltage of the image data serial signal 27 varies depending on the value S of the synchronization code serial signal 28 so that the signal value S of the synchronization code serial signal 28 and the signal value Y of the image data serial signal 27 are separated based on a predetermined comparison processing with comparison calculation in which formulae to be described later are used.

The synchronization code converting circuit 32 converts the reception-side synchronization code serial signal 35 output from the LVDS receiver 31 into a synchronization signal 37. In other words, out of a data sequence (a bit sequence) that is unique to the synchronization code serial signal 35, four types of synchronization codes, namely, a synchronization code FS that indicates the starting end of one frame of image data, a synchronization code FE that indicates the ending end of one frame, a synchronization code LS that indicates the starting end of one line that constitutes a part of one frame, and a synchronization code LE that indicates the ending end of one line, are converted into synchronization signals 37 which show the position of the image data.

The serial-parallel converting circuit 33 converts the image data serial signal 36 output from the LVDS receiver 31 into a parallel signal 38 having N bits per pixel (where N is a natural number).

The operational principle here is not different from that of a normal LVDS transmission and reception. More specifically, in the LVDS receiver 31, a current signal is interpreted as either "1" or "0" depending on in which direction the current signal flows into the resistor 4. It is possible to use a pair made up of the LVDS transmitter 22 and the LVDS receiver 31 at a high data transfer rate, while electromagnetic noises are kept at a minimum level.

The following describes an example of image data output from a camera module via the data transmission apparatus 2, using image data for a VGA size as an example. In image data for a VGA size, data for 640 pixels are included per line, and data for 480 lines are included per frame. In many cases, the data size for one pixel is 8 bits to 14 bits, depending on the bit number that is obtained when a signal from an image pickup element is quantified as a digital value.

Figure 2:
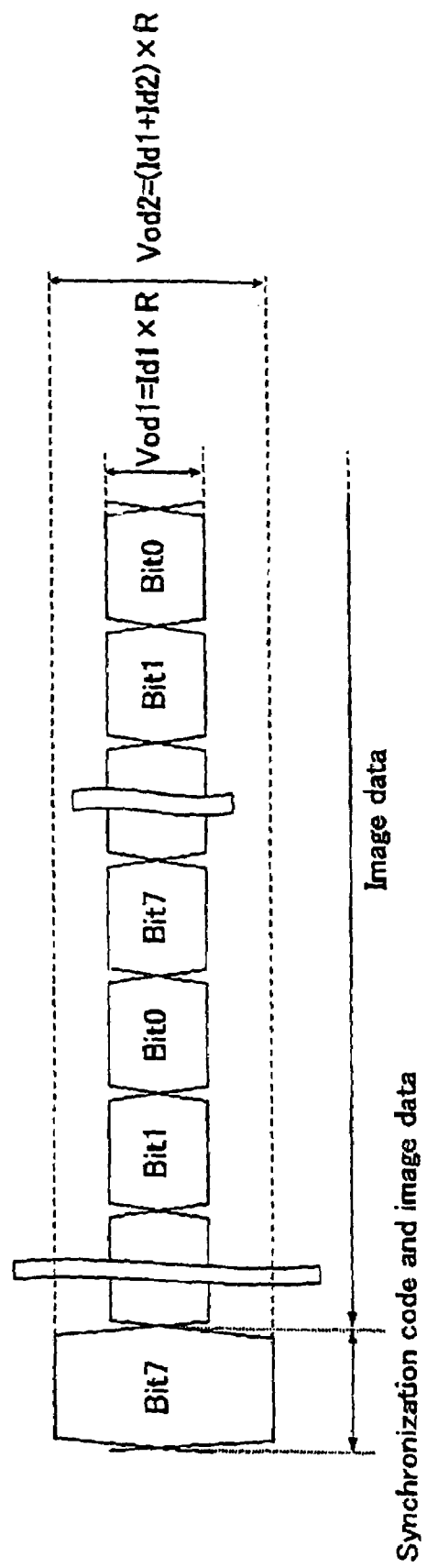
FIG. 2 shows a waveform pattern of a transmission and reception data differential amplitude signal in the digital data transmission and reception apparatus shown in FIG. 1.
Figure 3:
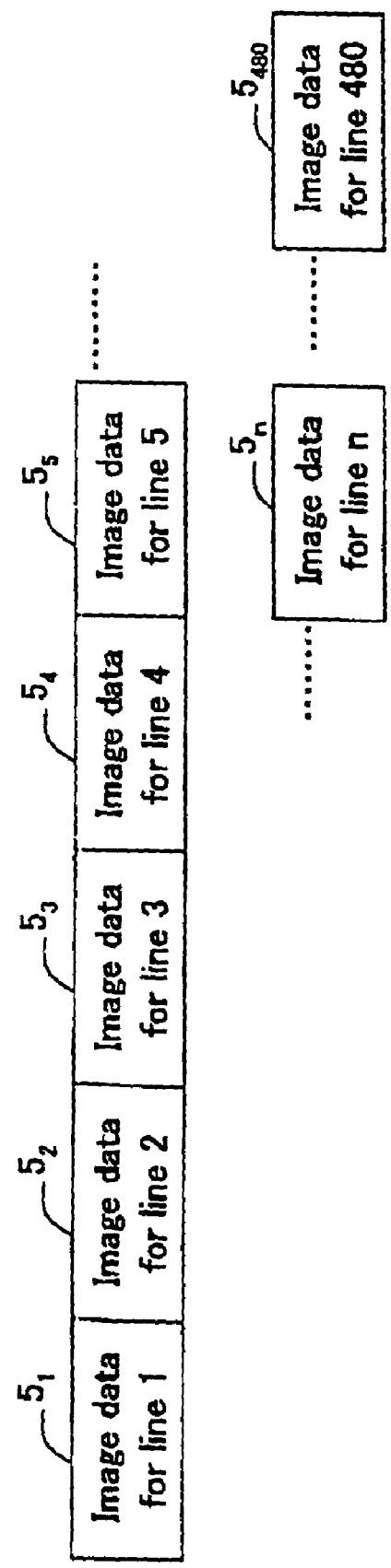
FIG. 3 shows the data configuration that illustrates an example of a serial transmission and reception data sequence in the digital data transmission and reception apparatus shown in FIG. 1.
Figure 6:
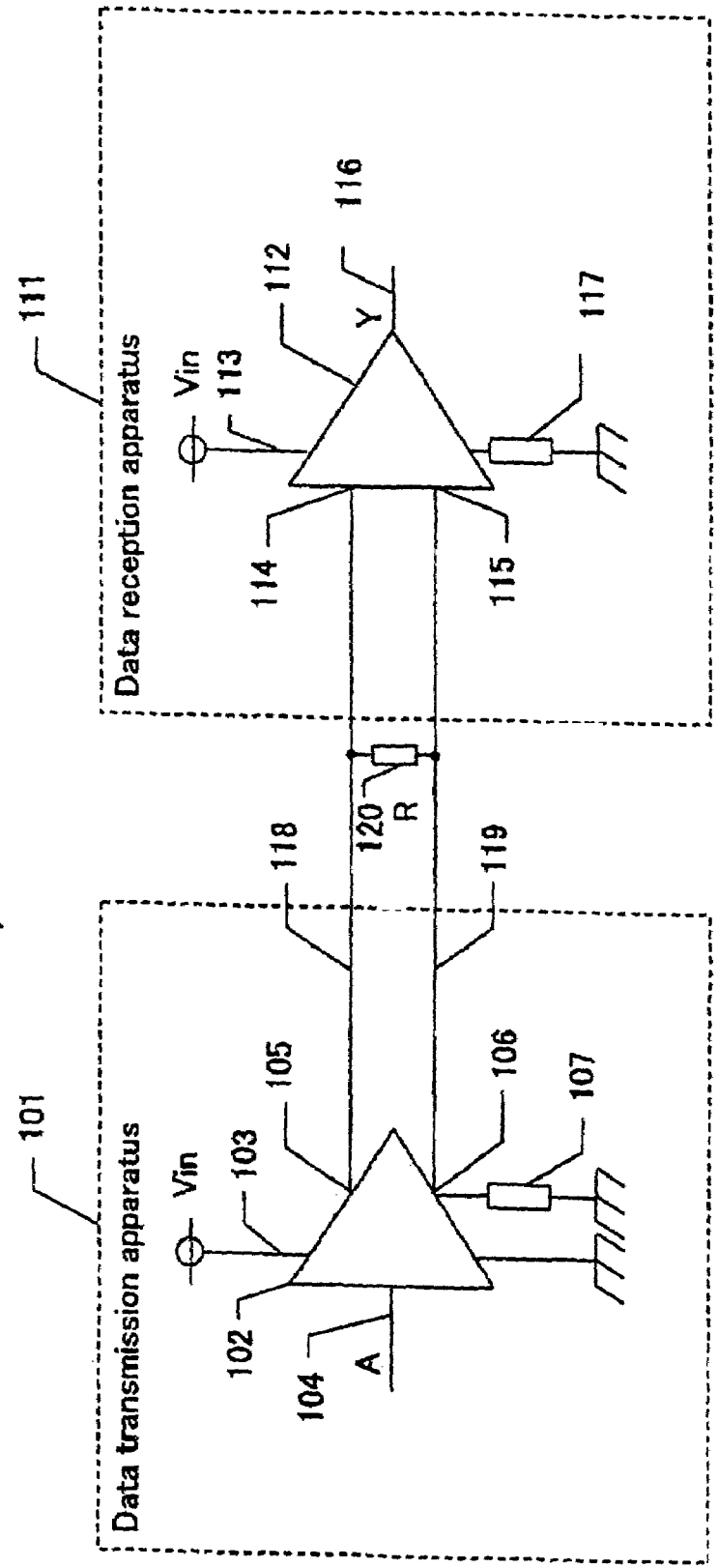
FIG. 6 is a block diagram that shows an example of the configuration of the main part of a conventional digital data transmission and reception circuit.
Figure 7:
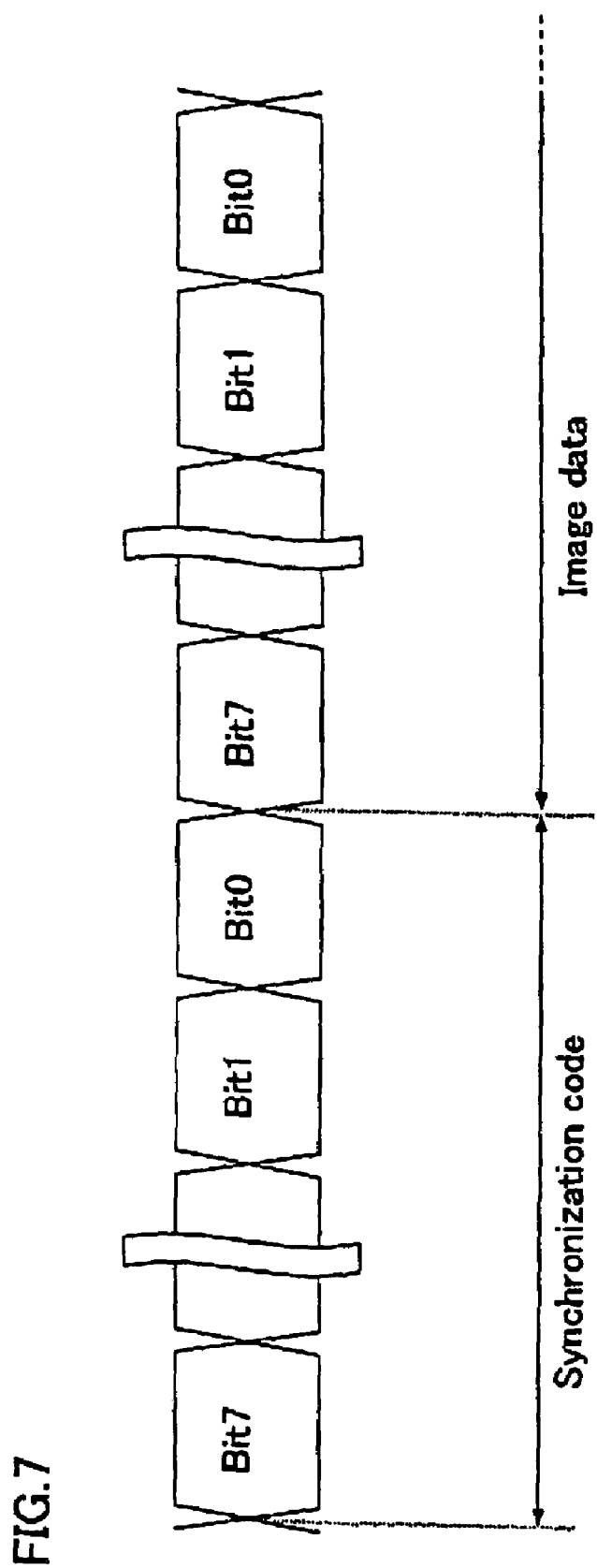
FIG. 7 shows a waveform pattern of a transmission and reception data differential amplitude signal in the digital data transmission and reception circuit shown in FIG. 6.
Figure 8:
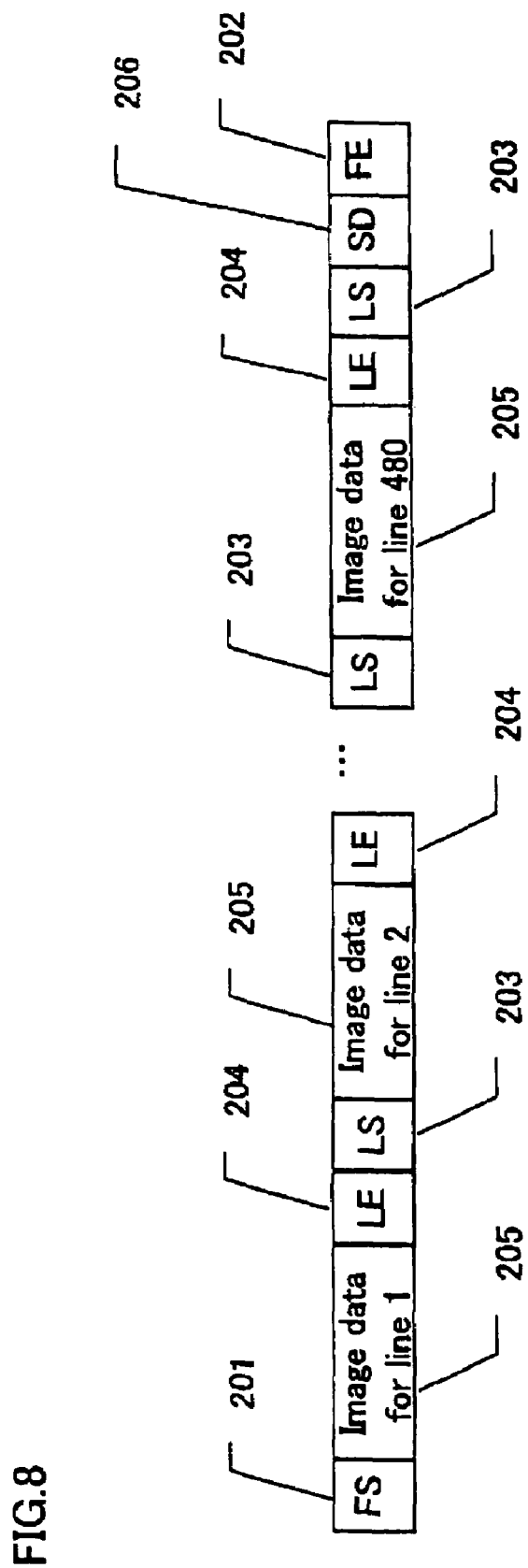
FIG. 8 shows a data configuration which illustrates an example of a serial transmission and reception data sequence in the digital data transmission and reception circuit shown in FIG. 6.

FIG. 2 shows a waveform pattern of the signal line from the LVDS transmitter 22 to the LVDS receiver 31, shown in FIG. 1. FIG. 3 shows the configuration of the signal data from the LVDS transmitter 22 to the LVDS receiver 31, shown in FIG. 1. FIG. 4 and FIG. 5 are tables that show examples of synchronization serial codes in accordance with FIG. 1.

The parallel-serial converting circuit 21 convert the transmission-side image data parallel signal 26 having N bits per pixel (where N is a natural number) into the transmission-side image data serial signal 27. The LVDS transmitter 22 controls the direction (either positive or negative) of the current flowing into the resistor 4, depending on the signal value Y of the transmission-side image data serial signal 27, the signal value Y being either "1" or "0".

Subsequently, in the case where the signal value S of the transmission-side synchronization code serial signal 28 inputted to the gate of the Nch transistor 23 is "1", the Nch transistor 23 is turned on. In the case where the signal value S of the transmission-side synchronization code serial signal 28 is "0", the Nch transistor 23 is turned off. With this arrangement, the current value $I_R$ flowing into the resistor 4 can be expressed as below:

$I_R = Id1 \ldots S="0"$ and $Y="0"$ $I_R = -Id1 \ldots S="0"$ and $Y="1"$ $I_R = (Id1+Id2) \ldots S="1"$ and $Y="0"$ $I_R = -(Id1+Id2) \ldots S="1"$ and $Y="1"$ Consequently, in the case where the current direction flowing into the resistor 4 is positive, the signal value Y of the image data serial signal 27 is "0"; In the case where the current direction flowing into the resistor 4 is negative, the signal value Y of the image data serial signal 27 is "1"; In the case where the amplitude of the differential amplitude signal of the image data serial signal is twice as large as normal, the signal value S of the synchronization code serial signal 28 is "1"; and in the case where the amplitude of the differential amplitude signal of the image data serial signal is normal, the signal value S of the synchronization code serial signal 28 is "0". In such a case, Id1=Id2 and $I_R$=Id1+Id2.

Consequently, in the case where an arrangement is made in which the signal value S of the transmission-side synchronization code serial signal 28 is "1", it is possible to multiplex the synchronization code with the image data so as to transmit them simultaneously by making the amplitude width of the differential voltage of the image data twice as large as in the case where the signal value S of the transmission-side synchronization code serial signal 28 is "0".

Subsequently, the differential signal transmitted by the LVDS transmitter 22 is received by the LVDS receiver 31, where the comparison processing to be described below is performed so that the signal value S of the reception-aide synchronization code serial signal 35 and the signal value Y of the reception-side image data serial signal 36 are output.

$S="1"$ and $Y="0" \ldots (R \times I_R) > 0$ and $(R \times I_R) > ((Id1+Id2) \times R)/2$ $S="0"$ and $Y="0" \ldots (R \times I_R) > 0$ and $(R \times I_R) < ((Id1+Id2) \times R)/2$ $S="1"$ and $Y="1" \ldots (R \times I_R) < 0$ and $(R \times I_R) < ((Id1+Id2) \times R)/2$ $S="0"$ and $Y="1" \ldots (R \times I_R) < 0$ and $(R \times I_R) > ((Id1+Id2) \times R)/2$ For example, from $S="1"$ and $Y="0" \ldots (R \times I_R) > 0$, it is understood that the direction of the current flowing into the resistor 4 is positive. From $(R \times I_R) > ((Id1+Id2) \times R)/2$, it is understood that the amplitude of the differential amplitude signal of the image data serial signal 27 is twice as large as normal.

With regard to the current values Id1 and Id2 flowing in the constant current power source 24 and the constant current source 25, it is desirable to arrange them so that Id2=Id1×2 is satisfied in order to optimize the level of resistance against communication errors that may occur when the LVDS receiver 31 performs the comparison processing. With this arrangement, it is possible to obtain the parallel image data 38 having N bits per pixel (where N is a natural number) which is output from the serial-parallel converting circuit 33 when the signal value Y of the reception-side image data serial signal 36 is inputted to the serial-parallel converting circuit 33. Further, it is possible to obtain the synchronization signal 37 which is output from the synchronization code converting circuit 32, when the signal value S of the reception-side synchronization code serial signal 35 is inputted to the synchronization code converting circuit 32.

Further, FIG. 4 shows synchronization code serial signals as examples of serial signal values each of which is to be added as the signal value S of the reception-side synchronization code serial signal 35. By using these synchronization code serial signals as a synchronization code FS that indicates the starting end of one frame, a synchronization code FE that indicates the ending end of the one frame, a synchronization code LS that indicates the starting end of one line, and a synchronization code LE that indicates the ending end of the one line, which are shown in FIG. 4, it is possible to easily and accurately recognize and separate image data for one line or image data for one frame without increasing the data amount in serial transmission. The examples shown in FIG. 4 illustrates the case where the data size of image data is 8 bits; however, it is possible to easily adapt the configuration to the case where the data size is extended to 10 bits or 14 bits by extending a synchronization code with "0"'s on the LSB side. Further, it is acceptable to use different types of serial signal values other than the examples shown in FIG. 4, as long as it to a unique serial data sequence in which FS, FE, LS, and LE can be identified.

As explained so far, according to the present embodiment, with the use of the serial transmission and reception method for transmitting and receiving data between the data transmission apparatus 2 and the data reception apparatus 3 wherein the parallel-serial converting circuit 21 converts an image data parallel signal into an image data serial signal, it is possible to realize image data output from a camera module with a smaller number of wirings and to reduce unnecessary radiant noises, to reduce costs and electric power consumption of the system, and to make the system smaller in size. Further, an arrangement is made wherein the LVDS transmitter 22 converts the image data serial signal output from the parallel-serial converting circuit 21 into a differential amplitude signal in such a manner that the amplitude of the differential voltage of the image data parallel signal varies depending on the value of the synchronization code serial signal, so that the signal values of the synchronization code serial signal and the image data serial signal are simultaneously transmitted. In this arrangement, on the reception side, the LVDS receiver 31 receives the differential amplitude signal in which the amplitude of the differential voltage of the image data serial signal varies depending on the value of the synchronization code serial signal, and the signal values of the synchronization code serial signal and the image data serial signal are separated and output based on a predetermined comparison processing. Due to the multiplexing processing and the separation processing of image data and synchronization codes, it is possible to easily and accurately recognize the positions of image data such as the starting end and the ending end of one frame, the starting end and the ending end of data for one line, as well as the starting end and the ending end of data for one pixel, without increasing the data amount in serial transmission. Furthermore, since these arrangements may be realized with a circuit having a small size, it is possible to make the transmission and reception timing control circuit smaller in size and to make the data transmission and reception processing faster.

It should be noted that, although the embodiment described above has a configuration in which a data sequence (a bit sequence) in the synchronization code serial signal 28 (or 35) includes a unique data sequence that makes it possible to identify four types of synchronization codes as positions of image data, namely, a synchronization code FS that indicates the starting end of one frame of image data, a synchronization code FE that indicates the ending end of the one frame, a synchronization code LS that indicates the starting end of one line that constitutes a part of the one frame, and a synchronization code LE that indicates the ending end of the one line; however, the present invention is not limited to this configuration. It is acceptable to have a configuration wherein in a data sequence of the synchronization code serial signal 28 (or 35), one type of synchronization codes each having N bits (where N is a natural number) indicate the starting end and the ending end of one frame of image data and the starting end and the ending end of one line that constitutes a part of the one frame. Alternatively, it is acceptable to have a configuration wherein in a data sequence of the synchronization code serial signal 28 (or 35), one type of synchronization codes each having N bits (where N to a natural number) indicates the starting end and the ending end of one frame of image data. Further, it is acceptable to have a configuration wherein in a data sequence of the synchronization code serial signal 28 (or 35), one type of synchronization code having N bits (where N is a natural number) indicates the starting end of one frame of image data. In other words, as long as at least the starting end of one frame of image data Is recognizable, it is possible to easily and accurately recognize the positions of image data, since the position of a data sequence in the synchronization code serial signal 28 (or 35) that follows is arranged in a predetermined order. Further, it is acceptable to have a configuration wherein in a data sequence of the synchronization code serial signal 28 (or 35), one type of synchronization codes each having N bits (where N is a natural number) indicate the starting end and the ending end of data for one pixel. Alternatively, it is acceptable to have a configuration wherein in a data sequence of the synchronization code serial signal 28 (or 35). one type of synchronization code having N bits (where N is a natural number) indicates the starting end of data for one pixel.

By using the synchronization code serial signal having one bit of signal value "1" at the starting end and the ending end of one frame as well as the starting end and the ending end of one line, the serial signal being shown in FIG. 5 as an example of a serial signal value to be added as a signal value S of the reception-side synchronization code serial signal 35, it is possible to easily recognize, without failure, the starting end and the ending end of one frame and the starting end and the ending end of image data for one line without increasing the data amount in serial transmission, and also to improve the level of resistance against communication errors that may occur in the data reception apparatus 3 on the receiver side. Further, by using the synchronization code serial signal having one bit of signal value "1" at the starting end and the ending end of data for one pixel, the serial signal being shown in FIG. 5 as an example of a serial signal value to be added as a signal value S of the reception-side synchronization code serial signal 35, it is possible to easily recognize, without failure, the positions of the starting end and the ending end of each pixel without increasing the data amount in serial transmission, and also to improve the level of resistance against communication errors that may occur in the data reception apparatus 3 on the receiver side.

In addition, in the embodiment described above, the constant current control section includes the transistor 23 and the constant current power sources 24 and 25 and is configured to supply a constant current that corresponds to either the constant current power sources 24 and 25 or the constant current power source 25 to the LVDS transmitter 22, depending on the value S of the synchronization code serial signal 28; however, the present invention is not limited to this arrangement. It is acceptable to have an arrangement wherein the constant control section includes a transistor that takes a synchronization code serial signal 28 as a gate input and a single constant current power source connected to the source side of the transistor and is configured to supply, to the LVDS transmitter 22, one of two types of constant currents that correspond to the gate input of the transistor depending on the value S of the synchronization code serial signal 28. In short, it is acceptable to have any arrangement as long as the constant current control section is able to control the constant current supplied to the LVDS transmitter 22 depending on the value S of the synchronization code serial signal 28.

As explained so far, although the present invention has been illustrated using the preferred embodiment of the present invention, the present invention should not be construed within the limitation of the embodiment. It is understood that the scope of the present invention should be construed only by the scope claimed in the claims. It is understood that an ordinary person skilled in the art is able to embody an equivalent scope based on the description of the present invention and technical common sense according to the specific preferred embodiment of the present invention. It is understood that the contents of the patents, patent applications, and other documents cited in the present specification should be used as reference supports for the present specification as if all such publications were incorporated herein.

According to the present invention, in the field of data transmission apparatuses for transferring data between, for example, an image display device of a mobile communication terminal apparatus and a camera module, data reception apparatuses for receiving data transmitted by such data transmission apparatuses, as well as data transmission and reception apparatuses and data transmission and reception methods in which these apparatuses are used, it is possible to easily and accurately recognize positions of image data without increasing the data amount in serial transmission, to make the data transmission and reception faster, and to make the transmission and reception timing control circuit smaller in size.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A data transmission apparatus comprising:
   a parallel-serial converting section for converting an image data parallel signal having N bits per pixel where N is a natural number into an image data serial signal; and
   a differential amplitude signal transmitting section for converting the image data serial signal output from the parallel-serial converting section into a differential amplitude signal by varying an amplitude of a differential voltage of the image data serial signal depending on a value of a synchronization code serial signal indicating a position of image data, so that the respective signal values of the synchronization code serial signal and the image data serial signal can be transmitted simultaneously.

2. A data transmission apparatus according to claim 1, wherein the differential amplitude signal transmitting section includes:
   an LVDS (Low Voltage Differential Signal) transmitting section for converting the image data serial signal output from the parallel-serial converting section into the differential amplitude signal; and
   a constant current control section for controlling a constant current supplied to the LVDS transmitting section depending on the value of the synchronization code serial signal.

3. A data transmission apparatus according to claim 2, wherein the constant current control section includes:
   a transistor section that takes the synchronization code serial signal as a gate input;
   a first constant current power source connected to a source side of the transistor section; and
   a second constant current power source connected in parallel to a series circuit that includes the transistor section and the first constant current power source, and
      wherein the constant current control section supplies a constant current to the LVDS transmitting section, the constant current corresponding to either the first and second current power sources or the second constant current power source, depending on the value of the synchronization code serial signal.

4. A data transmission apparatus according to claim 2, wherein the constant current control section includes:
   a translator section for receiving the synchronization code serial signal as a gate input; and
   a constant current power source connected to a source side of the transistor section, and
      wherein the constant current control section supplies one of two types of constant currents corresponding to the gate input to the LVDS transmitting section, depending on the value of the synchronization code serial signal.

5. A data transmission apparatus according to claim 1, further comprising:
   a resistance section provided between two output transfer lines of the LVDS transmitting section for converting a signal current output from the LVDS transmitting section into a signal voltage.

6. A data transmission apparatus, according to claim 1, wherein a data sequence of the synchronization code serial signal includes a unique data sequence in which four types of synchronization codes are identifiable as positional information of the image data, the four types of synchronization codes being a synchronization code FS indicating a starting end of one frame of the image data, a synchronization code FE indicating an ending end of the one frame, a synchronization code LS indicating a starting end of one line which constitutes a part of the one frame, and a synchronization code LE indicating an ending end of the one line.

7. A data transmission apparatus according to claim 1, wherein a data sequence of the synchronization code serial signal includes one type of synchronization code having N bits where N is a natural number, the one type of synchronization code indicating a starting end and an ending end of one frame of the image data and a starting end and an ending end of one line which constitutes a part of the one frame.

8. A data transmission apparatus according to claim 1, wherein a data sequence of the synchronization code serial signal includes one type of synchronization code having N bits where N is a natural number, the one type of synchronization code indicating a starting end and an ending end of one frame of the image data.

9. A data transmission apparatus according to claim 1, wherein a data sequence of the synchronization code serial signal includes one type of synchronization code having N bits where N is a natural number, the one type of synchronization code indicating a starting end of one frame of the image data.

10. A data transmission apparatus according to claim 1, wherein a data sequence of the synchronization code serial signal includes one type of synchronization code having N bits where N is a natural number, the one type of synchronization code indicating a starting end and an ending end of one pixel data of the image data.

11. A data transmission apparatus according to claim 1 wherein a data sequence of the synchronization code serial signal includes one type of synchronization code having N bits where N is a natural number, the one type of synchronization code indicating a starting end of one pixel data of the image data.

* * * * *